United States Patent
Athari

(10) Patent No.: US 7,068,016 B2
(45) Date of Patent: *Jun. 27, 2006

(54) ONE CYCLE CONTROL PFC BOOST CONVERTER INTEGRATED CIRCUIT WITH INRUSH CURRENT LIMITING, FAN MOTOR SPEED CONTROL AND HOUSEKEEPING POWER SUPPLY CONTROLLER

(75) Inventor: Frank Athari, Oceanside, CA (US)

(73) Assignee: International Rectifier Corporation, El Segundo, CA (US)

( * ) Notice: Subject to any disclaimer, the term of this patent is extended or adjusted under 35 U.S.C. 154(b) by 282 days.

This patent is subject to a terminal disclaimer.

(21) Appl. No.: 10/694,313

(22) Filed: Oct. 27, 2003

(65) Prior Publication Data

US 2004/0160128 A1 Aug. 19, 2004

Related U.S. Application Data

(60) Provisional application No. 60/431,858, filed on Dec. 9, 2002, provisional application No. 60/423,191, filed on Nov. 1, 2002.

(51) Int. Cl.
*G05F 1/10* (2006.01)

(52) U.S. Cl. .................................... 323/222
(58) Field of Classification Search ............. 361/93.9; 323/222, 282, 266
See application file for complete search history.

(56) References Cited

U.S. PATENT DOCUMENTS

| | | | | |
|---|---|---|---|---|
| 3,781,637 A | * | 12/1973 | Potter | 363/27 |
| 5,343,122 A | * | 8/1994 | Sugimori et al. | 315/209 R |
| 5,436,550 A | | 7/1995 | Arakawa | 323/222 |
| 6,011,707 A | | 1/2000 | Mine | 363/89 |
| 6,043,705 A | * | 3/2000 | Jiang | 327/589 |
| 6,163,470 A | * | 12/2000 | Chavez et al. | 363/53 |
| 6,225,797 B1 | * | 5/2001 | Willis et al. | 323/351 |
| 6,297,980 B1 | | 10/2001 | Smedley et al. | 363/89 |
| 6,781,352 B1 | * | 8/2004 | Athari et al. | 323/222 |

* cited by examiner

*Primary Examiner*—Stephen W. Jackson
*Assistant Examiner*—Boris Benenson
(74) *Attorney, Agent, or Firm*—Ostrolenk, Faber, Gerb & Soffen, LLP

(57) ABSTRACT

A power factor corrected boost converter circuit includes a rectifier connectable to an ac input and having a rectified dc output provided across a dc bus, an inductor having first and second terminals connected in one leg of the dc bus, an integrated circuit comprising a control circuit for controlling a switch, the integrated circuit including a housing enclosing the control circuit, the integrated circuit having a power terminal, a ground terminal, a first control input terminal coupled to an output of the converter circuit, and a second control input terminal coupled to a sensor for sensing current in the dc bus and further having an output terminal connected to the switch, a boost rectifier diode having a first terminal, the diode coupled to the inductor, and a storage capacitor connected to the diode. The control circuit comprises a one cycle control circuit having an integrator reset by a clock signal for each cycle of the clock signal. The circuit further includes any or all of an inrush current limiting circuit for limiting the current through the inductor to a value below a predetermined level, a fan motor speed controller and a housekeeping power supply controller.

36 Claims, 5 Drawing Sheets

ONE CYCLE CONTROL PFC BOOST CONVERTER INTEGRATED CIRCUIT WITH INRUSH CURRENT LIMITING, FAN MOTOR SPEED CONTROL AND HOUSEKEEPING POWER SUPPLY CONTROLLER

CROSS REFERENCE TO RELATED APPLICATION

This application is based on and claims priority to U.S. Provisional Application Ser. Nos. 60/423,191, filed Nov. 1, 2002 by Frank Athari entitled "ONE CYCLE CONTROL CONTINUOUS CONDUCTION MODE PFC BOOST CONVERTER IC WITH INRUSH CURRENT LIMIT AND FAN SPEED CONTROL" and Ser. No. 60/431,858, filed Dec. 9, 2002 by Frank Athari entitled "CONTINUOUS CONDUCTION MODE PFC BOOST CONVERTER IC WITH INTEGRATED INRUSH CURRENT LIMITED, FAN SPEED AND HOUSEKEEPING CONTROL", the entire disclosures of which are incorporated by reference herein.

BACKGROUND OF THE INVENTION

The One Cycle Control (OCC) technique for controlling switching circuits is now known. The general technique is described in U.S. Pat. No. 5,278,490. The technique is applied to a PFC (Power Factor Correction) boost converter in U.S. Pat. No. 5,886,586. In the OCC technique, as applied to a PFC boost converter circuit, the output voltage of the converter is sensed, compared to a reference voltage and supplied to an integrator stage, which is reset for each control cycle as set by a system clock. The integrator output is then compared in a comparator to the sensed input current in the converter and the output of the comparator is provided to control a pulse width modulator, whose output controls the boost converter switch. The switch controls the current supplied to the load so that the input ac line current is in phase with the input ac line voltage, i.e., the converter with attached load has a power factor of substantially unity and thus appears purely resistive, resulting in optimum power efficiency as well as reduced harmonics.

Prior to the OCC technique, a multiplier technique was known for PFC in a boost converter circuit. FIG. 1 depicts a system level block diagram representation of a typical prior art active power factor correction system operating in a fixed frequency, continuous conduction mode (CCM) boost converter topology. The system consists of a continuous conduction mode control integrated circuit 1, based on a multiplier approach, with discrete gate drive circuitry 3 and discrete power switch 5. This control method, based on current mode control, employs the use of a multiplier circuit, input current sensing, input voltage sensing, and output voltage sensing. The analog multiplier creates a current programming signal by multiplying the rectified line voltage by the output of a voltage error amplifier such that the current programming signal has the shape of the input voltage, and average amplitude, which ultimately controls the output voltage of the boost converter. The current loop is programmed by the rectified line voltage such that the input of the converter appears resistive. The output voltage is controlled by changing the average amplitude of the current programming signal. The result is a regulated output voltage and sinusoidal input current in phase and proportional to the input voltage.

The above prior art using the multiplier approach has the disadvantage of high discrete component count and complicated design and development effort required to implement high performance continuous conduction mode power factor correction converters. In addition, it is more difficult to implement a "single package" design wherein the switch is packaged with the control circuit because of the high component count and numbered pins. An example of a prior art PFC boost converter using the multiplier technique is shown in U.S. Pat. No. 6,445,600.

In U.S. patent application Ser. No. 10/319,982 filed Dec. 16, 2002, assigned to the assignee hereof, a PFC boost converter circuit employing the OCC technique is described comprising an integrated circuit for a PFC, CCM boost converter having an integrated switch and OCC controller and which reduces the complexity inherent in a PFC boost converter employing the multiplier technique.

There is a need, however, to incorporate additional features into this integrated circuit, including circuits to control inrush current, fan motor speed and the housekeeping power supply that powers internal circuits. It has been realized that the simplicity of the OCC control method allows integration of these additional "peripheral" functions often implemented external to the PFC Controller IC. This increases the value of such a controller compared to conventional multiplier based controllers given that there is more functionality per unit area of silicon.

The OCC technique dramatically simplifies the continuous conduction mode (CCM) PFC control function compared to conventional "multiplier" based CCM PFC controllers such as the prior art Unitrode/TI UC3854. The number of package pins are reduced dramatically since the OCC technique does not require line voltage sensing and does not need a complicated multiplier circuit with all its associated external components. The simplicity of this control method thus allows a higher level of integration while allowing use of practical pre-existing power packaging methods for full integration of the CCM boost PFC controller along with the additional peripheral functions referred to above. In addition, the power switching element may also be integrated in the package. An example of a packaging method that can be employed is shown in International Publication WO 01/39266 published May 31, 2001.

SUMMARY OF THE INVENTION

The present invention thus relates to an active power factor correction boost converter peferably operating in the continuous conduction mode (CCM) and incorporating selected ones of circuits for inrush current limiting, fan motor speed control and housekeeping power supply control. The invention is preferably implemented for continuous conduction mode because this is the most complicated PFC circuit, typically requiring many external components and package pins for the controller. The IC is preferably packaged with a MOSFET or IGBT Die preferably using packaging methods in WO 01/39266 above.

In PFC applications, there is often a need to limit the inrush current into the power supply system since large electrolytic bulk capacitors are often used to smooth out the output of the PFC Circuit. One method to limit inrush current is to place an inrush limiting resistor in series with the DC bus. This resistor is then by-passed using an electromagnetic relay or an active device such as a MOSFET or a thyristor, after sensing the inrush current level and comparing the magnitude with a fixed safe reference level.

According to the present invention, the PFC controller provides integrated circuitry which, 1. Senses inrush current,
2. Compares the measured inrush current to a fixed reference level
3. Provides a drive voltage/current to an electromagnetic relay or active device to shunt out the inrush resistor after the inrush current level has dropped below acceptable levels.

Given that this circuitry is integrated as part of the actual PFC controller, the inrush current already available at the current sense pin is detected and an enable signal is provided using an unused pin to a relay or an active switch after the sensed current level has fallen below a prescribed safe limit.

A second peripheral feature included in the PFC IC is a fan speed controller. A fan is often used to provide power supply cooling. Often this feature has to be implemented with external circuitry dedicated to fan speed control. This feature can be included onboard the PFC controller given that the load conditions of the power supply are all available internal to the PFC controller. The controller also has an on-board oscillator, which can be used for the Fan speed control PWM signal eliminating redundant switching circuits.

The fan speed can be directly controlled as a function of the PFC load current thus eliminating the need for complicated control schemes.

The implementation of the fan speed controller is a stream of PWM pulses going from 0 to 100% duty cycle linearly proportional to the load current as seen by the PFC controller.

Fixed speeds can also be programmed and activated under specific % load.

A third peripheral feature that may be included in the PFC IC is a housekeeping power supply controller. All converter circuits need housekeeping power supplies to power the control IC and ancillary circuit functions. The housekeeping power supply is typically driven from a dedicated controller. The present invention integrates the controller function of the housekeeper supply inside the same control IC as the PFC function. The benefits are:

1. Self sufficient front end PFC design without the need for another controller.
2. Elimination of external components and cost associated with housekeeping controllers.
3. Synchronization of switching frequencies eliminates noise coupling and improves overall performance.
4. Use of the VCC pin as the feedback pin for the housekeeping control section eliminates a redundant feedback pin.

Inclusion of this function onboard the PFC controller is simplified given that the controller already has an oscillator and the VCC pin can be used as the feedback pin for the housekeeping section eliminating extra pins.

The present invention thus relates to an active Power Factor Correction boost converter IC preferably operating in a continuous conduction mode (CCM) and including onboard at least one of an inrush current limiting controller, a fan speed controller and a housekeeping power supply controller.

The inrush current limit control circuit makes use of an existing current sensing resistor in order to measure the inrush current. It uses this information to trigger the by-pass element and sequence startup operation.

The fan speed controller regulates fan speed linearly as a function of load current sensed using the existing current sensing circuitry including the current sensing resistor. The fan speed can also be controlled using predefined duty cycles steps (speeds) for a given predetermined % load. Since the load information is available inside the PFC controller, this function is greatly simplified.

The housekeeping controller again utilizes the internal oscillator to provide an independent PWM control circuit specifically for a housekeeping power supply function. The existing VCC pin on the PFC controller is also used as the feedback pin for the housekeeping power supply output. This ensures the housekeeping power supply regulation is within the rating of the PFC IC.

According to the invention, there is provided a power factor corrected boost converter circuit comprising: a rectifier connectable to an ac input and having a rectified dc output provided across a dc bus, an inductor having first and second terminals connected in one leg of the dc bus, a first terminal of the inductor coupled to the output of said rectifier, an integrated circuit comprising a control circuit for controlling a switch, the integrated circuit comprising a housing enclosing the control circuit, the integrated circuit having a power terminal, a ground terminal, a first control input terminal coupled to an output of the converter circuit, a second control input terminal coupled to a sensor for sensing current in the dc bus and further having an output terminal connected to the switch, a boost rectifier diode having a first terminal, the first terminal of the diode coupled to the second terminal of the inductor; the diode having a second terminal; and a storage capacitor connected to the second terminal of the diode, wherein the control circuit comprises a one cycle control circuit having an integrator reset by a clock signal for each cycle of the clock signal, the integrator receiving as an input a signal provided on said first control input terminal, and further comprising an inrush current limiting circuit for limiting the current through the inductor to a value below a predetermined level.

According to another aspect, the invention comprises power factor corrected boost converter circuit comprising a rectifier connectable to an ac input and having a rectified dc output provided across a dc bus, an inductor having first and second terminals connected in one leg of the dc bus, a first terminal of the inductor coupled to the output of said rectifier, an integrated circuit comprising a control circuit for controlling a switch, the integrated circuit comprising a housing enclosing the control circuit, the integrated circuit having a power terminal, a ground terminal, a first control input terminal coupled to an output of the converter circuit, and a second control input terminal coupled to a sensor for sensing current in the dc bus and further having an output terminal connected to the switch, a boost rectifier diode having a first terminal, the first terminal of the diode coupled to the second terminal of the inductor, the diode having a second terminal; and a storage capacitor connected to the second terminal of the diode, wherein the control circuit comprises a one cycle control circuit having an integrator reset by a clock signal for each cycle of the clock signal, the integrator receiving as an input a signal provided on said first control input terminal, further comprising a fan motor speed control circuit, the fan motor speed control circuit regulating the fan motor speed as a function of the current sensed at said second control input terminal.

According to yet another aspect, the invention comprises a power factor corrected boost converter circuit comprising a rectifier connectable to an ac input and having a rectified dc output provided across a dc bus, an inductor having first and second terminals connected in one leg of the dc bus, a first terminal of the inductor coupled to the output of said rectifier, an integrated circuit comprising a control circuit controlling a switch, the integrated circuit comprising a housing enclosing the control circuit, the integrated circuit having a power terminal, a ground terminal, a first control input terminal coupled to an output of the converter circuit, and a second control input terminal coupled to a sensor for sensing current in the dc bus and further having an output terminal connected to the switch, a boost rectifier diode having a first terminal, the first terminal of the diode coupled to the second terminal of the inductor, the diode having a second terminal; and a storage capacitor connected to the second terminal of the diode, wherein the control circuit comprises a one cycle control circuit having an integrator reset by a clock signal for each cycle of the clock signal, the integrator receiving as an input a signal provided on said first control input terminal, further comprising a housekeeping power supply controller, said housekeeping power supply controller being controlled by a feedback voltage comprising the voltage level on said power terminal.

The invention also relates to an integrated circuit controller for a PFC boost converter.

Other features and advantages of the present invention will become apparent from the following description of the invention which refers to the accompanying drawings.

BRIEF DESCRIPTION OF THE DRAWING(S)

DETAILED DESCRIPTION OF PREFERRED EMBODIMENTS

Figure 2:
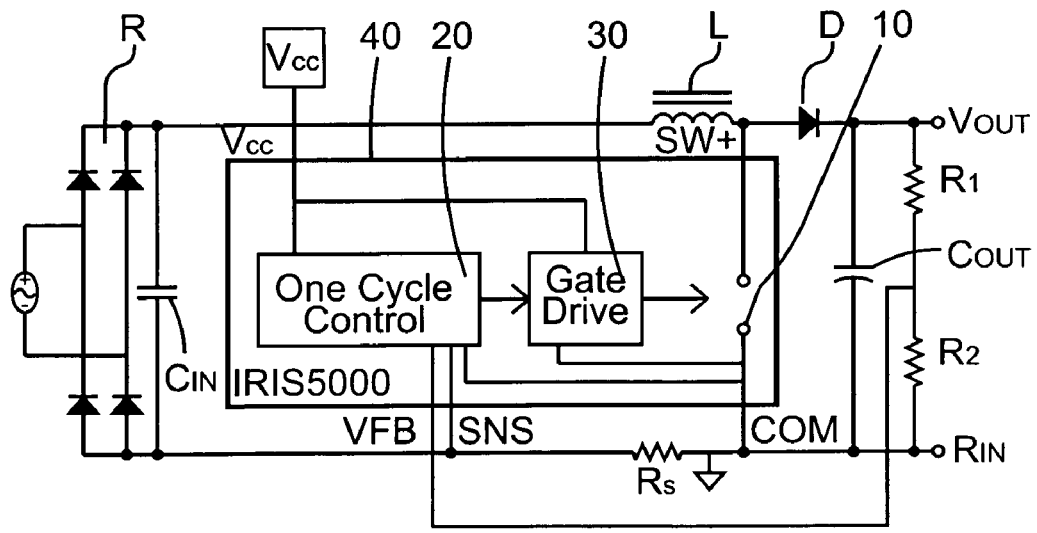
FIG. 2 is a block diagram of a CCM PFC boost converter circuit using the OCC technique wherein the switch and controller are housed in a single module, as described in the above identified U.S. application Ser. No. 10/319,982.

FIG. 2 depicts a system level block diagram representation based on the OCC active power factor correction technique operating in a fixed frequency, continuous conduction mode boost converter topology. In CCM, the current in the inductor L is never allowed to become zero. In the circuit of FIG. 2, the power switch 10 and the OCC based PFC control circuit 20 with on board power switch driver 30 are integrated into a single package 40 capable of dissipating appropriate heat from the device to a heat sink. Various power packages can be employed using this technique since the number of pins required to implement a full CCM PFC boost converter is reduced with the use of the OCC technique.

Figure 1:
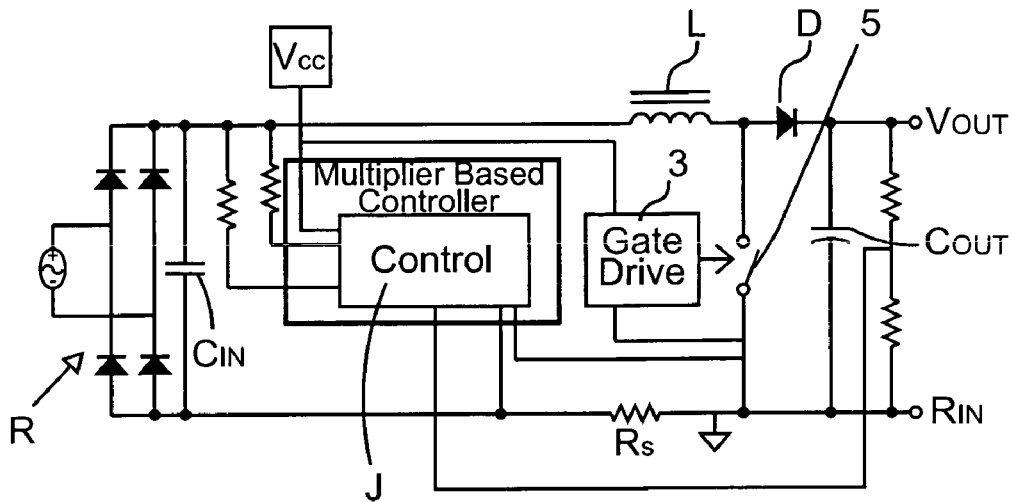
FIG. 1 is a block diagram of a prior art multiplier-based CCM PFC boost converter circuit.

The control circuit 20 is based on the OCC method in which the multiplier and input voltage sensing referred to in the prior art circuit of FIG. 1 are not required. This allows package pins and external components of the IC 40 to be reduced. The OCC concept is realized with a simple linear circuit incorporating integration-reset control, in which the duty cycle of the switch 10 is controlled in real-time such that the average value of the switched variable in each cycle is equal to or proportional to a control reference. In particular, the output voltage of the converter is compared to the control reference by an error amplifier. This error signal is integrated. The magnitude of the error controls the slope of the integrator output, which is then compared to the sensed input current to control the duty cycle of the switch. This control method forces the input of the converter to appear resistive, thus forcing a sinusoidal input current in phase and proportional to the input voltage, and providing a regulated DC output voltage. Integrating the controller along with the power switch in one package simplifies the complicated task of designing a continuous conduction mode PFC circuit as compared to traditional discrete multiplier based CCM PFC controllers.

Again, with reference to FIG. 2, the rectifier block R provides a rectified dc voltage to the dc bus. An input capacitor Cin filters high frequency content. When switch 10 is on, electromagnetic energy is stored in inductor L. When the switch 10 is turned off, the stored energy in inductor L is transferred via high frequency rectifier diode D to storage capacitor $C_{out}$ providing power to the load. When the switch 10 again is on, diode D is reverse biased and storage capacitor $C_{out}$ provides power to the load. The duty cycle of switch 10 is controlled by OCC circuit 20 such that the ac input current is in phase with the ac line voltage. The converter and load thus have a near unity power factor and appear to be purely resistive, resulting in maximum power efficiency. A sense resistor RS is provided for sensing the input current.

Figure 3:
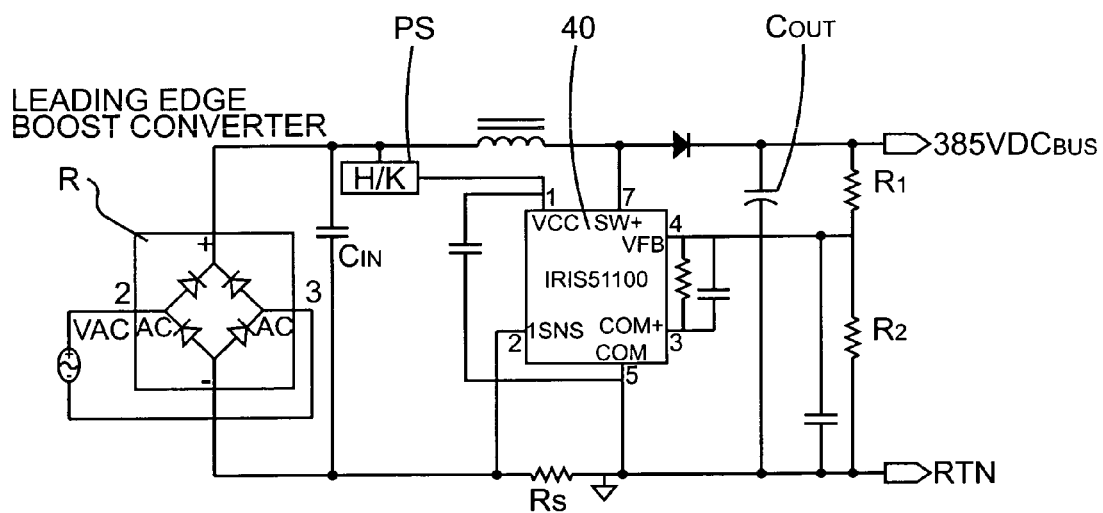
FIG. 3 shows one application of the integrated circuit of FIG. 2.
Figure 4A:
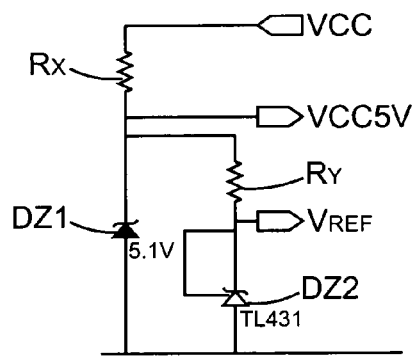
FIG. 4A shows how power and reference voltages are generated for the integrated circuit of FIG. 2.
Figure 4:
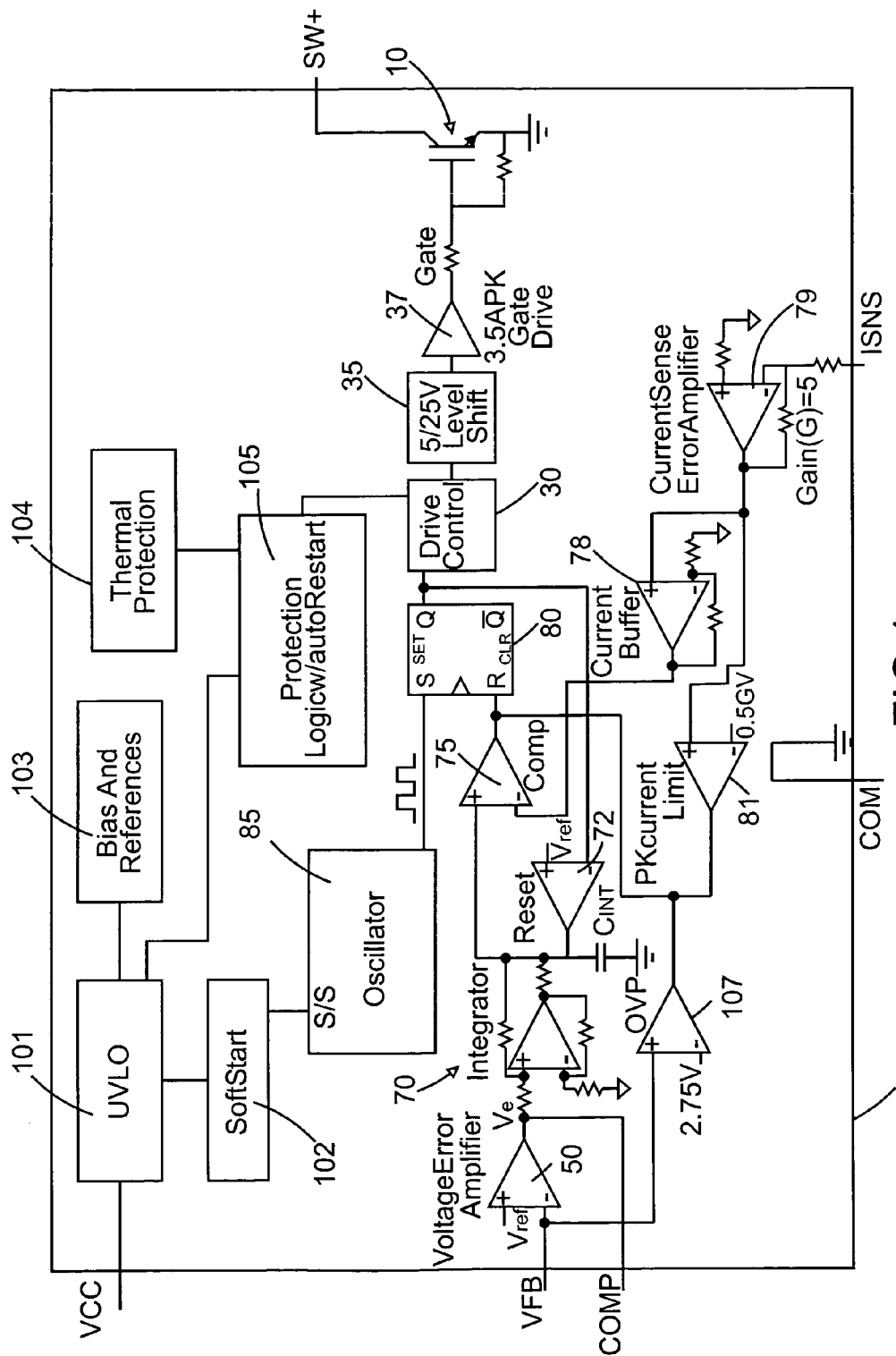
FIG. 4 shows the block diagram of the integrated circuit of FIG. 2.

FIG. 3 shows details of one implementation of the integrated circuit 40 applied to a PFC CCM boost converter and FIG. 4 shows the block diagram of IC 40. IC 40 is preferably provided with power by a power supply PS which receives power from the DC bus. Internally, in IC 40, a voltage regulator circuit comprising a resistor RX and zener diode DZ1 can be employed to provide internal power (VCC 5V). See FIG. 4A. A reference voltage Vref for the error amplifier can also be provided by a similar circuit including a resistor RY and zener diode DZ2 as shown in FIG. 4A.

With reference also to FIG. 4, the output voltage is sensed by resistor divider $R_1$, $R_2$ and provided to input VFB of IC 40, which is one input to an error amplifier 50. The other input of error amplifier 50 is the reference voltage Vref. The error amplifier 50 generates an error signal Ve. The amplified error signal Ve is provided to the input of an integrator stage 70. The output of the integrator is provided to one input of comparator 75, where it is compared to the sensed input current, provided by the output of current buffer 78 which is fed by current sense amplifier 79. The input current is converted to a voltage by resistor Rs and provided to input ISNS. A peak current limiter 81 operates to limit the current sensed to a predefined peak current. The output of peak current limiter 81 is provided to the output of comparator 75. The output of the comparator 75 is provided to a driver stage, e.g., a clocked SR flip flop 80, the output of which is provided to control the conduction time of switch 10. A system clock 85 controls the system frequency. The output of flip flop 80 is thus a pulse width modulated signal whose pulse width determines the on time of switch 10. The output of the integrator 70, which is responsive to the average value of the variation of the output voltage from the desired reference V ref, is compared to the input current waveform (as determined by the voltage drop across Rs) by comparator 75 to reset flip flop 80 when the integrator output exceeds the sensed input current. This modulates the on time of the switch 10, forcing the input current to follow the input voltage in phase and regulating the output voltage to minimize the error signal Ve. The clock sets the system frequency, ensuring that in each clock period, the integrator is reset. Reset of the integrator is accomplished via reset controller 72 when the output of flip flop 80 is reset.

Figure 5:
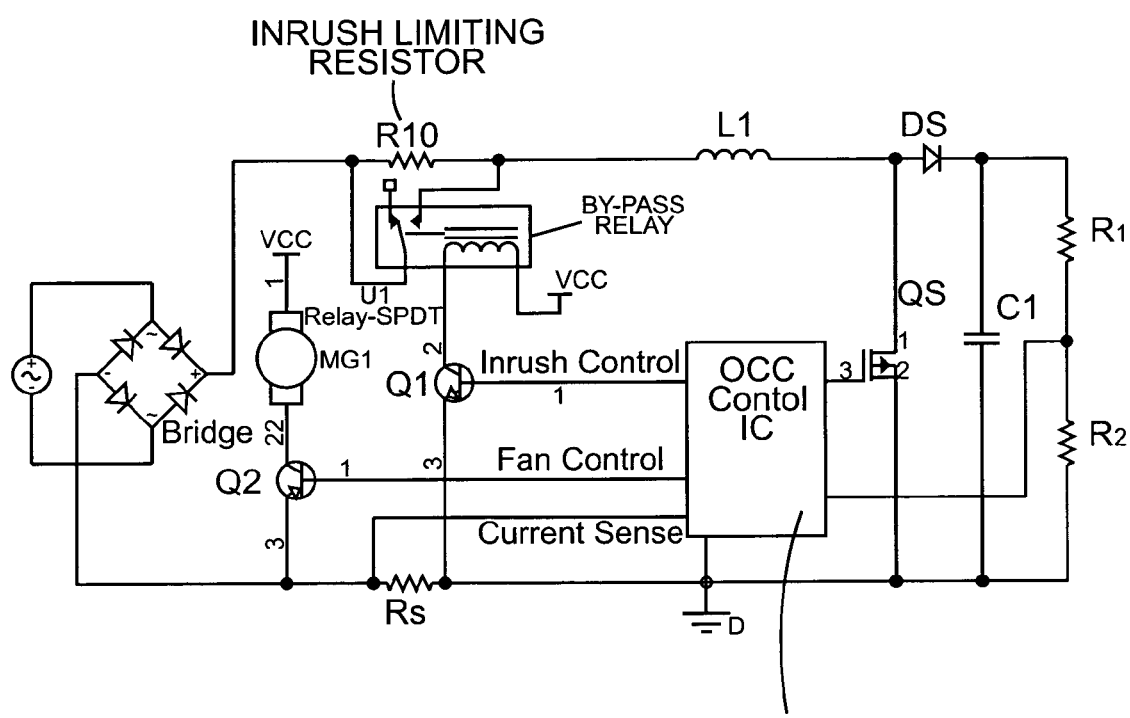
FIG. 5 shows one embodiment of the invention incorporating both inrush current limiting and fan speed control.

FIG. 5 depicts a system level block diagram representation of the invention based on the "One Cycle Control" active power factor correction system operating in a fixed frequency, continuous conduction mode boost converter topology. FIG. 5 shows the inrush current limiting and fan motor speed control peripheral functions implemented.

The control IC 40A is based on the "One Cycle Control" method described above.

In PFC applications, there is often a need to limit the inrush current into the power supply system since large electrolytic bulk capacitors are often used to smooth out the output of the PFC circuit. According to the present invention, an inrush limiting resistor R10 is disposed in series with the DC bus. The resistor R10 is then by-passed using an electromagnetic relay U1 or an active device such as a MOSFET or a thyristor, after sensing the inrush current level and comparing the magnitude with a fixed safe reference level and determining it is below the safe level.

The One Cycle Control PFC controller provides integrated circuitry which,
1. Senses inrush current,
2. Compares the measured inrush current to a fixed reference level
3. Provides a drive voltage/current to the relay or active device to shunt out the inrush resistor R10 after the inrush current level has dropped below acceptable levels.

Given that this circuitry is integrated as part of the PFC controller, the inrush current already available at the current sense pin is detected as a voltage across resistor RS and an enable signal is provided using an unused pin to a relay U1 or an active switch after the sensed current level has fallen below a prescribed safe limit to shunt out the resistor R10.

With reference to FIG. 5, the one cycle control integrated circuit has been modified as shown at 40A to include a fan speed control and inrush current control. As described previously, with PFC applications there is often a need to limit the inrush current into the power supply system since large electrolytic bulk capacitors are often used to smooth out the output of the PFC circuit, for example, capacitor C1. A resistor R10 is placed in series in the DC bus. Resistor R10 is then bypassed using a relay U1 or an active device such as a MOSFET or a thyristor after sensing the inrush current level and comparing the magnitude with the fixed safe reference level. According to the present invention, the PFC controller provides integrated circuitry that senses the inrush current via resistor RS and compares the measured inrush current to a fixed reference level. The OCC control IC 40A controls transistor Q1. If the sensed inrush current is above the predetermined level, the resistor R10 disposed in series with the inductor L1 limits the inrush current. Transistor Q1 remains off. The contacts of the relay U1 are disposed across the resistor. If the inrush current is above the predetermined safe level, the coil of relay U1 is not energized because transistor Q1 is off. Thus resistor R10, disposed in series in the DC bus, limits the inrush current. Once the inrush current falls below the predetermined level, transistor Q1 is turned on by IC 40A, energizing the coil of relay U1 and shunting the resistor R10 so it is no longer in circuit.

As would be obvious to a person of skill in the art based upon the above, transistor Q1 can alternatively be controlled such that it is turned on when the inrush current is above the predetermined level, and the relay contacts rewired so that resistor R10 is maintained in series with the inductor L1, thereby limiting the inrush current. Once the inrush current falls below the predetermined level, transistor Q1 can be turned off, thereby deenergizing the relay coil and bypassing the resistor R10 so that the inrush current is no longer limited.

A second peripheral feature included in the PFC IC 40A is a fan speed controller. Often this feature is implemented with external circuitry dedicated to fan speed control. According to the invention, this feature is included onboard the PFC controller given that the load conditions of the power supply are all available internal to the PFC controller. The controller also has an on-board oscillator 85 (see FIG. 4), which can be used for the fan speed control PWM signal eliminating redundant switching circuits.

The fan speed can be directly controlled as a function of the PFC load current sensed across resistor RS thus eliminating the need for complicated control schemes.

The output from IC 40A for fan speed control is a stream of PWM pulses going from 0 to 100% duty cycle linearly proportional to the load current sensed across RS as seen by the PFC controller. These PWM pulses are applied to the base of transistor Q2 to control the motor speed.

Fixed speeds can also be programmed and activated under specific % load.

The inrush current limit circuit makes use of existing circuitry sensing current via resistor RS for sensing PFC current to measure inrush current. It uses this information to trigger the by-pass element U1 or other active device and sequence startup operation.

The fan speed controller regulates fan speed linearly as a function of load current sensed employing existing current sensing circuitry using resistor RS. The fan speed can also be controlled using predefined duty cycles steps (speeds) for a given predetermined % load.

A third peripheral feature included in the PFC IC is a housekeeping power supply controller. All converter circuits need housekeeping power supplies to power the control IC and ancillary circuit functions. The housekeeping power supply is typically driven from a dedicated controller. The present invention integrates the controller function of the housekeeper inside the same control IC as the PFC function. The benefits are,
1. Self sufficient front end PFC design without the need for another controller.
2. Elimination of external components and cost associated with housekeeping controllers.
3. Synchronization of switching frequencies eliminates noise coupling and improves overall performance.
4. Use of the VCC pin as the feedback pin for the housekeeping control section eliminates a redundant feedback pin.

Inclusion onboard of this feature in the PFC controller is simplified given that the controller already has an oscillator and the VCC pin can be used as the feedback pin for the housekeeping section eliminating extra pins.

The housekeeping controller utilizes the internal oscillator 85 (see FIG. 4) to create an independent PWM control circuit specifically for the housekeeping power supply function. The existing VCC pin on the PFC controller is also used as the feedback pin for the housekeeping power supply output. This ensures the housekeeping power supply regulation is within the rating of the PFC IC.

Figure 6:
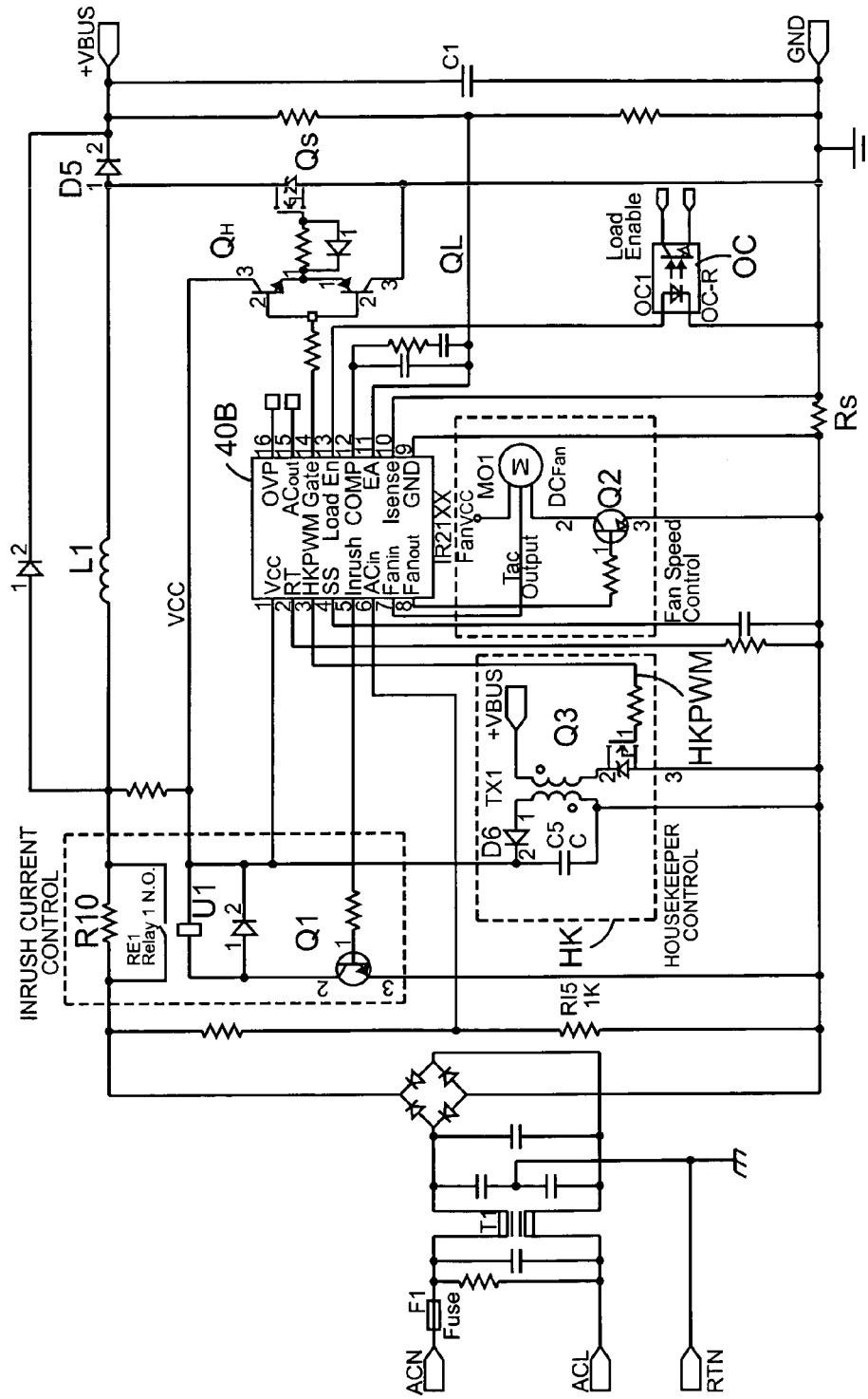
FIG. 6 shows a second embodiment of the invention incorporating inrush current limiting, fan speed control and housekeeping power supply control.

FIG. 6 shows a circuit diagram employing an integrated circuit 40B which employs inrush current control and fan speed control as shown in FIG. 5 and which also includes a housekeeper power supply control. In addition, the circuit of FIG. 6 employs some additional functions to be described below.

The inrush current limiting is achieved in the same way as shown in FIG. 5. Transistor Q1, relay U1 and resistor R10 are employed to limit the inrush current based on the sensed inrush current sensed via resistor RS.

Fan motor speed control is accomplished by transistor Q2 in the same way as described with reference to FIG. 5, again based on the sensed PFC current sensed via resistor RS.

The circuit of FIG. 6 also includes a housekeeper power supply control HK. Housekeeper power supply controller HK is controlled by an output HK PWM from integrated circuit 40B. A pulse width modulated signal is provided to the gate of a transistor comprising an FET Q3. The gate of transistor Q3 is pulse width modulated and drives the primary of a transformer TX1. The primary of transformer TX1 is coupled to output voltage VBUS. The secondary output of the transformer TX1 is rectified by a diode D6 and filtered by a capacitor C5. The output from diode D6 is then supplied to VCC to provide power to the chip 40B. VCC functions as a feedback pin to control the duty cycle of the PWM signal on IC output HK PWM.

As shown in both FIGS. 5 and 6, the integrated circuits 40A and 40B are shown so that they do not include the power switch QS as part of the integrated circuit. In addition, in the circuit shown in FIG. 6, the drivers QH and QL are also disposed outside the integrated circuit. The transistors QH, QL and QS can also be incorporated in the integrated circuits 40A, 40B.

FIG. 6 also shows a typical load enable opto-coupler OC which is controlled by a load enable signal which informs the controller that the load is enabled and ready to receive power.

The advantages of the invention are (a) lower component count; (b) higher reliability due to lower parts count; (c) simpler PCB implementation; (d) minimized layout issues due to tight packaging of critical components of the control and power switching components; and (e) simplified design and development effort based on the simpler OCC method as opposed to the more complex multiplier based PFC controllers.

In addition, IC 40 includes other standard functions shown in FIG. 4 such as under voltage/low voltage (UVLO) detection circuitry 101, soft start circuitry 102, necessary bias and reference voltage generators 103, thermal protection 104, circuit protection logic with automatic restart 105 (for such functions as over-current protection and output over-voltage protection107). Further, integrated drive control 30, level shifting circuitry 35 and peak current limiting gate drive circuitry 37 are also provided.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. A power factor corrected boost converter circuit comprising:
   a rectifier connectable to an ac input and having a rectified dc output provided across a dc bus;
   an inductor having first and second terminals connected in one leg of the dc bus, a first terminal of the inductor coupled to the output of said rectifier;
   an integrated circuit comprising a control circuit for controlling a switch, the integrated circuit comprising a housing enclosing the control circuit, the integrated circuit having a power terminal, a ground terminal, a first control input terminal coupled to an output of the converter circuit, and a second control input terminal coupled to a sensor for sensing current in the dc bus and further having an output terminal connected to the switch;
   a boost rectifier diode having a first terminal, the first terminal of the diode coupled to the second terminal of the inductor, the diode having a second terminal; and
   a storage capacitor connected to the second terminal of the diode;
   wherein the control circuit comprises a one cycle control circuit having an integrator reset by a clock signal for each cycle of the clock signal, the integrator receiving as an input a signal provided on said first control input terminal;
   further comprising an inrush current limiting circuit for limiting the current through the inductor to a value below a predetermined level.

2. The converter circuit of claim 1, wherein the integrated circuit includes the switch and a gate driver for driving the switch receiving an output from the control circuit; and the output terminal of the integrated circuit comprises a main terminal of the switch.

3. The converter of claim 1, wherein the output terminal of the integrated circuit is coupled to a control terminal of the switch.

4. The converter circuit of claim 1, wherein the converter circuit operates in continuous conduction mode.

5. The converter circuit of claim 1, further comprising a sense resistor in one leg of said dc bus, one terminal of the sense resistor being coupled to the second control input terminal, said sense resistor providing a signal indicative of the inrush current.

6. The converter circuit of claim 1, wherein the inrush current limiting circuit comprises a resistor in series with the inductor and a controlled bypass circuit for bypassing the resistor when the inrush current is below the predetermined level.

7. A power factor corrected boost converter circuit comprising:
   a rectifier connectable to an ac input and having a rectified dc output provided across a dc bus;
   an inductor having first and second terminals connected in one leg of the dc bus, a first terminal of the inductor coupled to the output of said rectifier;
   an integrated circuit comprising a control circuit for controlling a switch, the integrated circuit comprising a housing enclosing the control circuit, the integrated circuit having a power terminal, a ground terminal, a first control input terminal coupled to an output of the converter circuit, and a second control input terminal coupled to a sensor for sensing current in the dc bus and further having an output terminal connected to the switch;
   a boost rectifier diode having a first terminal, the first terminal of the diode coupled to the second terminal of the inductor, the diode having a second terminal; and
   a storage capacitor connected to the second terminal of the diode;
   wherein the control circuit comprises a one cycle control circuit having an integrator reset by a clock signal for each cycle of the clock signal, the integrator receiving as an input a signal provided on said first control input terminal;

further comprising a fan motor speed control circuit, the fan motor speed control circuit regulating the fan motor speed as a function of the current sensed at said second control input terminal.

8. The converter circuit of claim 7, wherein the fan motor speed control circuit comprises a control device receiving a pulse width modulated drive signal from said integrated circuit.

9. The converter circuit of claim 7, wherein the integrated circuit includes the switch and a gate driver for driving the switch receiving an output from the control circuit and the output terminal of the integrated circuit comprises a main terminal of the switch.

10. The converter circuit of claim 7, wherein the output terminal of the integrated circuit is coupled to a control terminal of the switch.

11. The converter circuit of claim 7, wherein the converter circuit operates in continuous conduction mode.

12. The converter circuit of claim 7, further comprising a sense resistor in one leg of said dc bus, one terminal of the sense resistor being coupled to the second control input terminal.

13. A power factor corrected boost converter circuit comprising:
   a rectifier connectable to an ac input and having a rectified dc output provided across a dc bus;
   an inductor having first and second terminals connected in one leg of the dc bus, a first terminal of the inductor coupled to the output of said rectifier;
   an integrated circuit comprising a control circuit for controlling a switch, the integrated circuit comprising a housing enclosing the control circuit, the integrated circuit having a power terminal, a ground terminal, a first control input terminal coupled to an output of the converter circuit, and a second control input terminal coupled to a sensor for sensing current in the dc bus and further having an output terminal connected to the switch;
   a boost rectifier diode having a first terminal, the first terminal of the diode coupled to the second terminal of the inductor, the diode having a second terminal; and
   a storage capacitor connected to the second terminal of the diode;
   wherein the control circuit comprises a one cycle control circuit having an integrator reset by a clock signal for each cycle of the clock signal, the integrator receiving as an input a signal provided on said first control input terminal;
   further comprising a housekeeping power supply controller, said housekeeping power supply controller being controlled by a feedback voltage comprising the voltage level on said power terminal.

14. The converter circuit of claim 13, wherein the integrated circuit includes the switch and a gate driver for driving the switch receiving an output from the control circuit and the output terminal of the integrated circuit comprises a main terminal of the switch.

15. The converter circuit of claim 13 wherein the output terminal of the integrated circuit is coupled to a control terminal of the switch.

16. The converter circuit of claim 13, wherein the converter circuit operates in continuous conduction mode.

17. The converter circuit of claim 13, further comprising a sense resistor in one leg of said dc bus, one terminal of the sense resistor being coupled to the second control input terminal.

18. The converter circuit of claim 13, wherein the housekeeping power supply controller comprises a controlled device controlled by a PWM signal from the integrated circuit to generate a housekeeping power supply voltage derived from the output voltage of the converter circuit.

19. An integrated circuit for a power factor corrected boost converter circuit, the boost converter circuit including a rectifier connectable to an ac input and having a rectified dc output provided across a dc bus; an inductor having first and second terminals connected in one leg of the dc bus, a first terminal of the inductor coupled to the output of said rectifier; a boost rectifier diode having a first terminal coupled to the second terminal of the inductor and having a second terminal; and a storage capacitor connected to the second terminal of the diode; the integrated circuit comprising:
   a control circuit for controlling a switch, the integrated circuit comprising a housing enclosing the control circuit, the integrated circuit having a power terminal, a ground terminal, a first control input terminal for coupling to an output of the converter circuit, and a second control input terminal for coupling to a sensor for sensing current in the dc bus and further having an output terminal connected to the switch;
   wherein the control circuit comprises a one cycle control circuit having an integrator reset by a clock signal for each cycle of the clock signal, the integrator receiving as an input a signal provided on said first control input terminal;
   further comprising an inrush current limiting circuit for limiting the current through the inductor to a value below a predetermined level.

20. The integrated circuit of claim 19, further wherein the switch is integrated in the integrated circuit and further comprising a gate driver for driving the switch receiving an output from the control circuit, the output terminal of the integrated circuit comprising a main terminal of the switch.

21. The integrated circuit of claim 19, wherein the output terminal of the integrated circuit is coupled to a control terminal of the switch.

22. The integrated circuit of claim 19, wherein the boost converter circuit operates in continuous conduction mode.

23. The integrated circuit of claim 19, further wherein the boost converter circuit includes a sense resistor in one leg of said dc bus, one terminal of the sense resistor for coupling to the second input terminal, said sense resistor providing a signal indicative of the inrush current.

24. The converter circuit of claim 19, wherein the inrush current limiting circuit comprises a resistor in series with the inductor and a controlled bypass circuit for bypassing the resistor when the inrush current is below the predetermined level.

25. An integrated circuit for a power factor corrected boost converter circuit, the boost converter circuit including a rectifier connectable to an ac input and having a rectified dc output provided across a dc bus; an inductor having first and second terminals connected in one leg of the dc bus, a first terminal of the inductor coupled to the output of said rectifier; a boost rectifier diode having a first terminal coupled to the second terminal of the inductor and having a second terminal; and a storage capacitor connected to the second terminal of the diode; the integrated circuit comprising:
   a control circuit for controlling a switch, the integrated circuit comprising a housing enclosing the control circuit, the integrated circuit having a power terminal, a ground terminal, a first control input terminal for coupling to an output of the converter circuit, and a second control input terminal for coupling to a sensor for sensing current in the dc bus and further having an output terminal connected to the switch;

wherein the control circuit comprises a one cycle control circuit having an integrator reset by a clock signal for each cycle of the clock signal, the integrator receiving as an input a signal provided on said first control input terminal;

further comprising a fan motor speed control circuit, the fan motor speed control circuit regulating the fan motor speed as a function of the current sensed at said second control input terminal.

26. The integrated circuit of claim 25, wherein the fan motor speed control circuit comprises a control device receiving a pulse width modulated drive signal from said integrated circuit.

27. The integrated circuit of claim 25, further wherein the switch is integrated in the integrated circuit and further comprising a gate driver for driving the switch receiving an output from the control circuit, the output terminal of the integrated circuit comprising a main terminal of the switch.

28. The integrated circuit of claim 25, wherein the output terminal of the integrated circuit is coupled to a control terminal of the switch.

29. The integrated circuit of claim 25, wherein the boost converter circuit operates in continuous conduction mode.

30. The integrated circuit of claim 25, further wherein the boost converter circuit includes a sense resistor in one leg of said dc bus, one terminal of the sense resistor for coupling to the second control input terminal.

31. An integrated circuit for a power factor corrected boost converter circuit, the boost converter circuit including a rectifier connectable to an ac input and having a rectified dc output provided across a dc bus; an inductor having first and second terminals connected in one leg of the dc bus, a first terminal of the inductor coupled to the output of said rectifier; a boost rectifier diode having a first terminal coupled to the second terminal of the inductor and having a second terminal; and a storage capacitor connected to the second terminal of the diode; the integrated circuit comprising:

a control circuit for controlling a switch, the integrated circuit comprising a housing enclosing the control circuit, the integrated circuit having a power terminal, a ground terminal, a first control input terminal for coupling to an output of the converter circuit, and a second control input terminal for coupling to a sensor for sensing current in the dc bus and further having an output terminal connected to the switch;

wherein the control circuit comprises a one cycle control circuit having an integrator reset by a clock signal for each cycle of the clock signal, the integrator receiving as an input a signal provided on said first control input terminal;

further comprising a housekeeping power supply controller;

said housekeeping power supply controller being controlled by a feedback voltage comprising the voltage level on said power terminal.

32. The integrated circuit of claim 31, wherein the switch is integrated into the integrated circuit and further comprising a gate driver for driving the switch receiving an output from the control circuit, the output terminal of the integrated circuit comprising a main terminal of the switch.

33. The integrated circuit of claim 31, wherein the output terminal of the integrated circuit is coupled to a control terminal of the switch.

34. The integrated circuit of claim 31, wherein the boost converter circuit operates in continuous condition mode.

35. The integrated circuit of claim 31, further wherein the boost converter circuit includes a sense resistor in one leg of said dc bus, one terminal of the sense resistor for coupling to the second control input terminal.

36. The integrated circuit of claim 31, wherein the housekeeping power supply controller comprises a controlled device controlled by a PWM signal from the integrated circuit to generate a housekeeping power supply voltage derived from the output voltage of the converter circuit.

* * * * *